(12) United States Patent
Lin et al.

(10) Patent No.: US 8,246,245 B2
(45) Date of Patent: Aug. 21, 2012

(54) LASER-AIMING DEVICE FOR RADIANT THERMOMETER

(75) Inventors: Kevin Lin, Hsinchu (TW); Allen Lo, Hsinchu County (TW)

(73) Assignee: Radiant Innovation Inc., HsinChu (TW)

( * ) Notice: Subject to any disclaimer, the term of this patent is extended or adjusted under 35 U.S.C. 154(b) by 0 days.

(21) Appl. No.: 13/166,540

(22) Filed: Jun. 22, 2011

(65) Prior Publication Data

US 2012/0163409 A1     Jun. 28, 2012

(30) Foreign Application Priority Data

Dec. 28, 2010    (TW) ................................ 99146414 A

(51) Int. Cl.
    *G01J 5/00*         (2006.01)
    *G01K 12/16*      (2006.01)
(52) U.S. Cl. ........................................ 374/121; 374/120
(58) Field of Classification Search .................... 374/121
    See application file for complete search history.

(56) References Cited

U.S. PATENT DOCUMENTS

| | | | |
|---|---|---|---|
| 4,315,150 A * | 2/1982 | Darringer et al. .......... | 250/338.1 |
| 5,524,984 A | 6/1996 | Hollander et al. | |
| 5,626,424 A | 5/1997 | Litvin et al. | |
| 5,727,880 A * | 3/1998 | Hollander et al. ............ | 374/121 |
| 5,836,694 A * | 11/1998 | Nguyen ........................ | 374/130 |
| 7,114,861 B1 * | 10/2006 | Tung ............................. | 385/92 |
| 7,550,725 B2 | 6/2009 | Hollander et al. | |
| 2006/0050766 A1 * | 3/2006 | Hollander et al. ............ | 374/121 |
| 2009/0262012 A1 * | 10/2009 | Carlson et al. ................ | 342/351 |
| 2010/0018067 A1 * | 1/2010 | Tung ............................. | 33/286 |
| 2010/0195697 A1 * | 8/2010 | Hollander et al. ............ | 374/121 |

FOREIGN PATENT DOCUMENTS

TW            371484        12/1998

* cited by examiner

*Primary Examiner* — Lisa Caputo
*Assistant Examiner* — Jamel Williams
(74) *Attorney, Agent, or Firm* — Muncy, Geissler, Olds & Lowe, PLLC

(57) ABSTRACT

The present invention discloses a laser-aiming device for a radiant thermometer, which comprises a laser adjustment seat, a laser device, and a prism having two inclined faces. The laser adjustment seat is arranged on a temperature detection device of the radiant thermometer. The laser device and the prism are arranged on the laser adjustment device. The laser device generates a laser beam. The prism is located at the illuminated side of the laser beam and coaxial with the laser device, refracting the laser beam into two laser beams that generate two laser spots designating the detectable area of the radiant thermometer.

7 Claims, 6 Drawing Sheets

LASER-AIMING DEVICE FOR RADIANT THERMOMETER

BACKGROUND OF THE INVENTION

1. Field of the Invention

The present invention relates to a radiant thermometer, particularly to a laser-aiming device for a radiant thermometer.

2. Description of the Related Art

Thermometers may be roughly categorized into the contact type and the non-contact type. Because the non-contact type thermometer is extensively used in various fields, it has been the mainstream temperature measurement technology in recent times. The non-contact type thermometers include the industrial radiant thermometer, the optical-fiber thermometer, the thermographic camera, and the radiant ear thermometer.

The detectable area of a radiant thermometer is proportional to the distance between the thermometer and the object. A video system or an aiming device is usually equipped on a radiant thermometer to enable the user to learn the detectable area. The video system is usually equipped on a high-price radiant thermometer and hard to popularize. The middle- or low-price radiant thermometer usually adopts a laser-aiming device, wherein a laser device is attached to the top of a radiant thermometer and generates a laser spot to indicate the user of the center of the detectable area. However, such a technology cannot tell the user the detectable area exactly. Thus, the user often obtains an incorrect temperature.

There are various solutions proposed to overcome the abovementioned problems. In a Taiwan patent No. 371484, a diffraction element is arranged before a laser device to deflect the laser light. However, the output laser light is not necessarily coaxial with the housing of the laser device exactly. Beside, the laser device is unlikely to adjust in the prior art. Thus, the diffracted light is neither necessarily parallel to the optical axis of the thermometer nor guaranteed to project on the correct position. In a U.S. Pat. No. 5,626,424, a 45-degree semitransparent mirror and a complicated adjustment device are arranged before a laser device to split a laser beam into two laser beams, and then the two laser beams intersect somewhere. The overall architecture of the technology is somewhat complex.

Accordingly, the present invention proposes a novel laser-aiming device for a radiant thermometer to overcome the abovementioned problems.

SUMMARY OF THE INVENTION

The primary objective of the present invention is to provide a simple-structure, low-price and easy-to-calibrate laser-aiming device for a radiant thermometer.

Another objective of the present invention is to provide a laser-aiming device for a radiant thermometer, wherein a prism having two inclined faces enables a laser device to generate two laser beams forming two laser spots for designating the detectable area of the radiant thermometer.

To achieve the abovementioned objectives, the present invention proposes a laser-aiming device for a radiant thermometer, which comprises a laser adjustment seat, a laser device, and a prism. The laser adjustment seat is arranged on a temperature detection device of the radiant thermometer. The laser device is arranged on the laser adjustment seat and generates a laser beam. The prism is arranged on the laser adjustment seat and located at the illuminated side of the laser beam. The prism is coaxial with the laser device and has two inclined faces to refract the laser beam into two laser beams that form two laser spots to indicate the detectable area of the radiant thermometer.

Below, the embodiments are described in detail to make easily understood the objectives, technical contents, characteristics and accomplishments of the present invention.

DETAILED DESCRIPTION OF THE INVENTION

Figure 1:
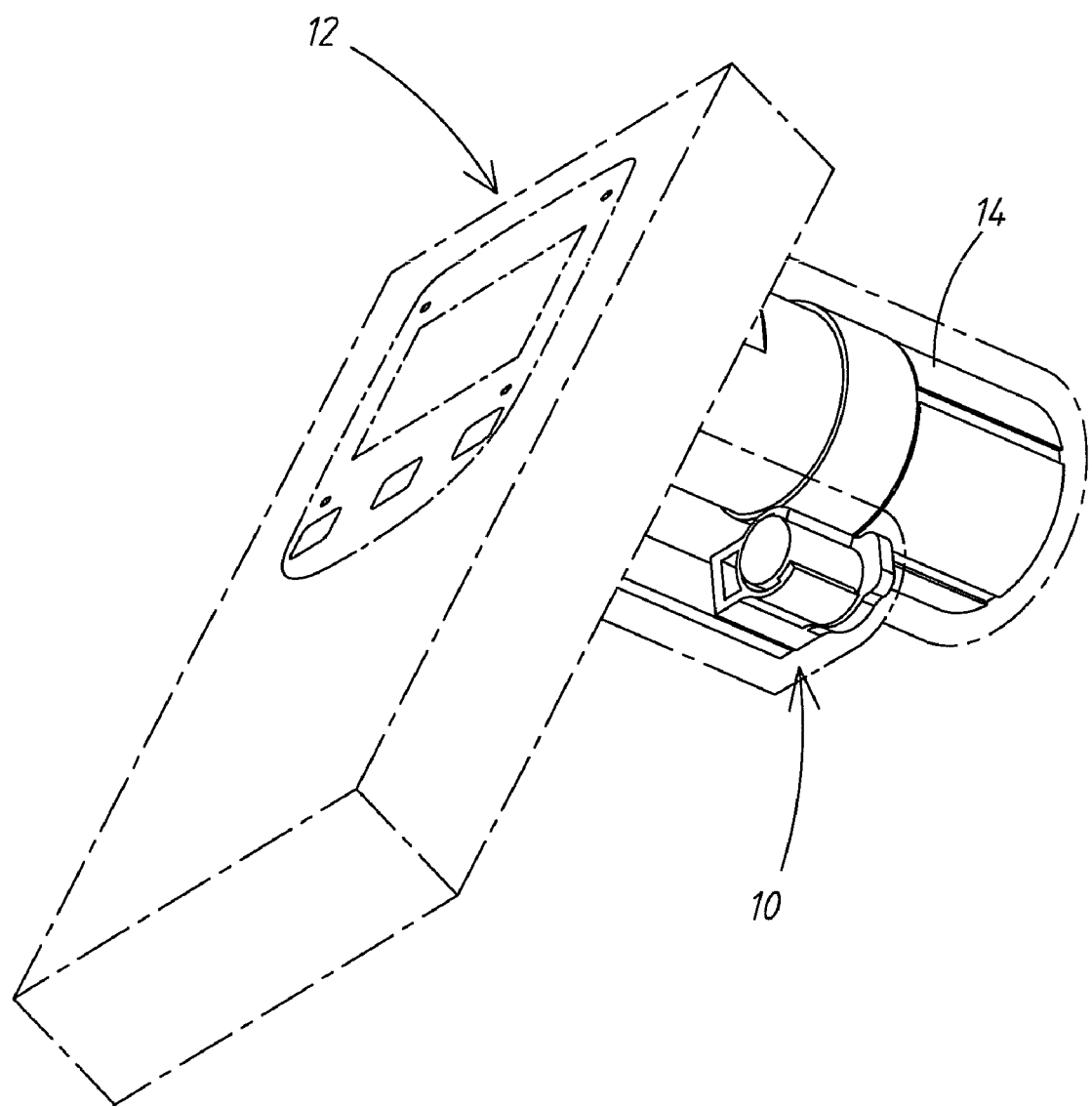
FIG. 1 is a perspective view schematically showing a radiant thermometer integrated with a laser-aiming device according to one embodiment of the present invention.
Figures 2, 2A:
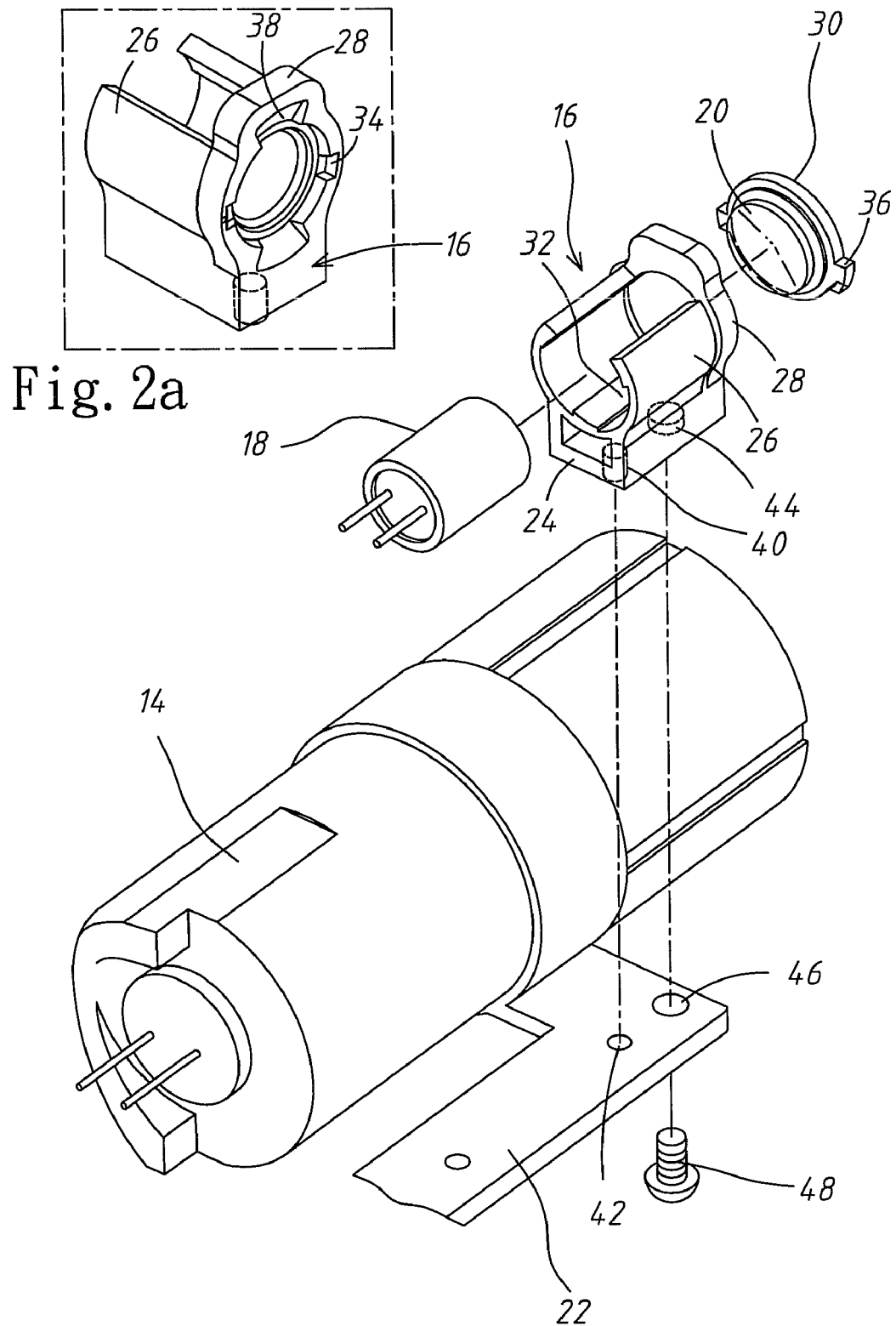
FIG. 2 is an exploded view schematically showing a temperature detection device integrated with a laser-aiming device according to one embodiment of the present invention.
FIG. 2a is a partially enlarged view schematically showing some components of a laser-aiming device according to one embodiment of the present invention.
Figure 3:
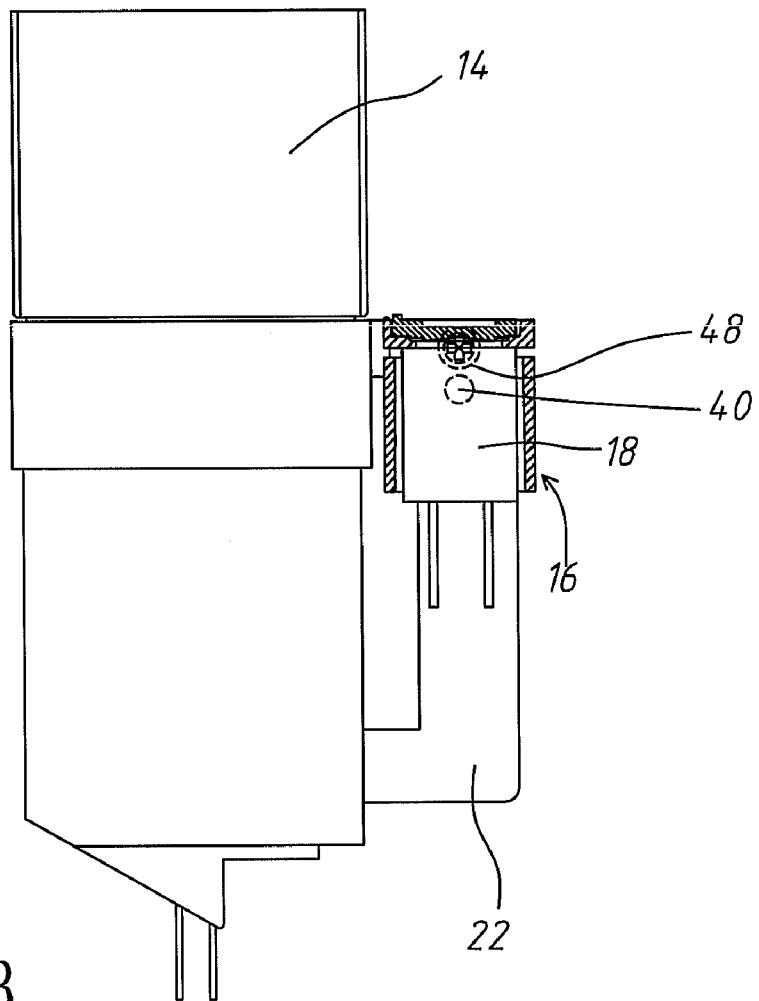
FIG. 3 is a top view schematically showing a laser-aiming device according to one embodiment of the present invention.
Figure 4:
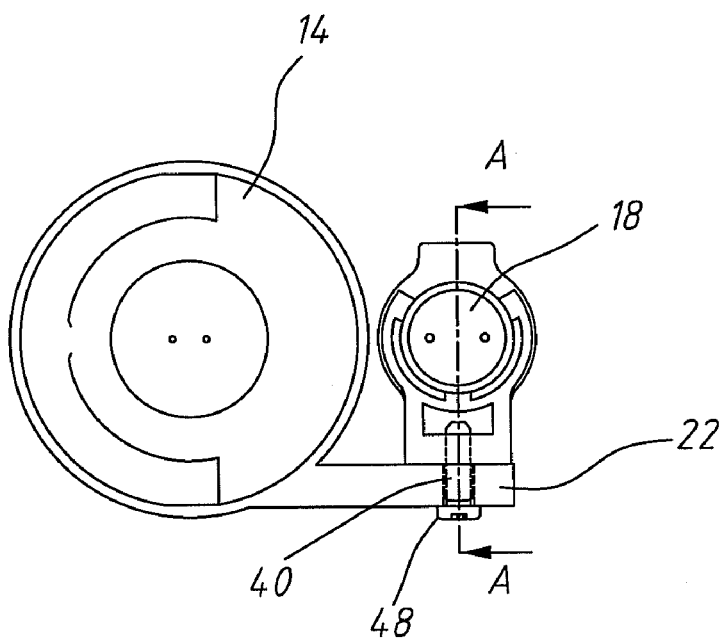
FIG. 4 is a rear view schematically showing a laser-aiming device according to one embodiment of the present invention.
Figure 5:
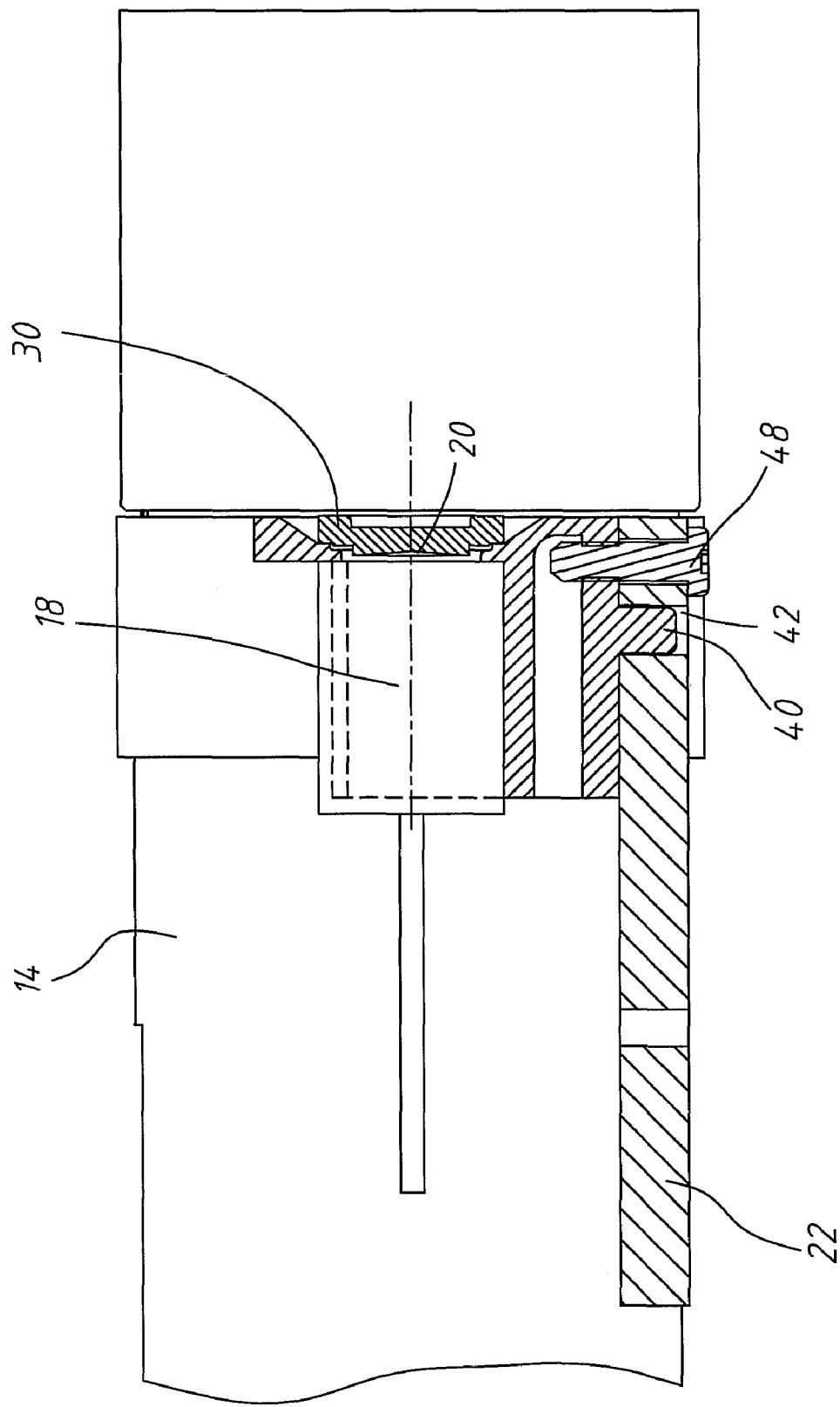
FIG. 5 is a sectional view along Line AA in FIG. 4.

Refer to FIGS. 1-5. FIG. 1 is a perspective view of a radiant thermometer integrated with a laser-aiming device according to one embodiment of the present invention. FIGS. 2-5 are respectively an exploded view, a top view, a rear view, and a sectional view of a laser-aiming device for a radiant thermometer according to one embodiment of the present invention. FIG. 2a is a partially enlarged view of some components of a laser-aiming device for a radiant thermometer according to one embodiment of the present invention.

Figure 6:
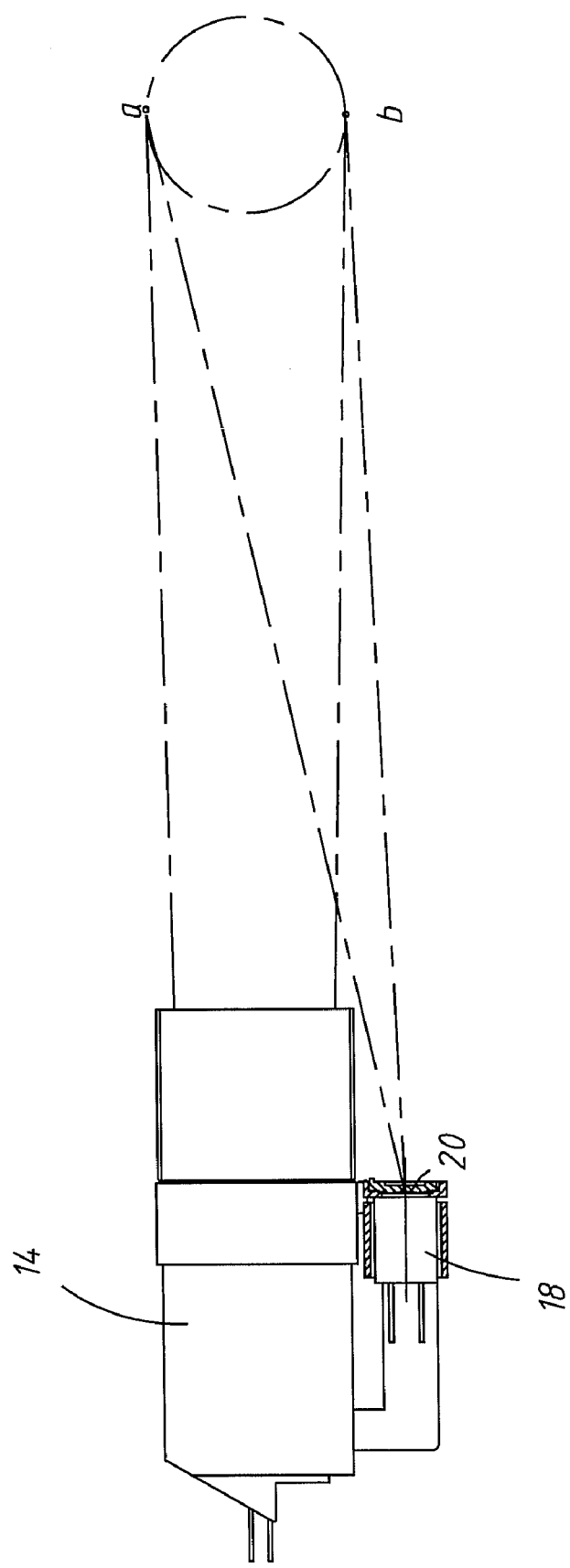
FIG. 6 is a diagram schematically showing the operation of a radiant thermometer integrated with a laser-aiming device according to one embodiment of the present invention.

The laser-aiming device 10 of the present invention is integrated with a radiant thermometer 12 to designate the detectable area of the radiant thermometer 12. The radiant thermometer 12 includes a temperature detection device 14. The laser-aiming device 10 comprises a laser adjustment seat 16, a laser device 18 and a prism 20. The laser adjustment seat 16 is arranged on the temperature detection device 14. The laser device 18 is arranged on the laser adjustment seat 16 and generates a laser beam. The prism 20 is arranged on the laser adjustment seat 16 and located at the illuminated side of the laser beam. The prism 20 is coaxial with the laser device 18 and has two inclined faces to refract the laser beam into two laser beams. The two laser beams form two laser spots a and b to designate the detectable area of the temperature detection device 14, as shown in FIG. 6.

The laser-aiming device 10 further comprises a laser installation seat 22 arranged on the outer wall of the temperature detection device 14 and used to fix the laser adjustment seat 16.

The laser adjustment seat 16 includes a base 24, a laser device fixing member 26, a prism press-fit member 28 and a prism holding member 30. The laser device fixing member 26 is arranged in the base 24 and has a cylinder-like shape, and the cylinder-like shape has at least one concentric rib 32 on the inner surface thereof, whereby the laser device 18 that is arranged inside the laser device fixing member 26 can rotate with respect to the laser device fixing member 26. The cylinder-like shape may be a ¾ cylinder (as shown in the drawings), whereby the laser device fixing member 26 has appropriate flexibility enabling the laser device 18 to rotate inside the laser device fixing member 26 without vibration. In one embodiment, the laser device fixing member 26 has three concentric ribs 32. The concentric ribs 32 are used to fix the laser device 18 and make the laser device 18 coaxial with the prism 20.

The prism press-fit member 28 is arranged on the base 24 and located at the front end of the laser device fixing member 26. The prism press-fit member 28 has two press-fit notches 34. The prism 20 is held by the prism holding member 30. The prism holding member 30 has two press-fit protrusions 36 corresponding to the press-fit notches 34. The press-fit protrusions 36 will be press-fitted to the press-fit notches 34. The prism press-fit member 28 further has a resin-filling groove 38, via which a resin is filled into the laser device fixing member 26 to stick the laser device 18 to the laser device fixing member 26.

The base 24 has a rotatable adjustment shaft 40 protruding from the bottom thereof. The laser installation seat 22 has a shaft insertion hole 42 corresponding to the rotatable adjustment shaft 40, whereby the laser adjustment seat 16 can be rotated for calibration after the laser adjustment seat 16 has been installed on the laser installation seat 22.

The base 24 has a first fastening hole 44, and the laser installation seat 22 has a second fastening hole 46. A fastening element 48 is inserted through the second and first fastening holes 46 and 44 fastening the laser adjustment seat 16 to the laser installation seat 22.

Via the abovementioned structure, the present invention provides two adjustment mechanisms for the laser-aiming device, wherein a prism splits a single laser beam into two laser beams that form two laser spots to designate the detectable area of a temperature detection device. The first adjustment mechanism is that the laser device 18 installed inside the laser device fixing member 26 can be rotated with respect to the laser device fixing member 26 to adjust the positions of the laser spots formed by the two laser beams emitted from the prism 20. The second adjustment mechanism is that the entire laser adjustment seat 16 can be rotated with respect to the laser installation seat 22 via the rotatable adjustment shaft 40 inserted in the shaft insertion hole 42. The adjustment mechanisms implement calibrating radiant thermometers before the manufacturer delivers them.

Figure 7A:
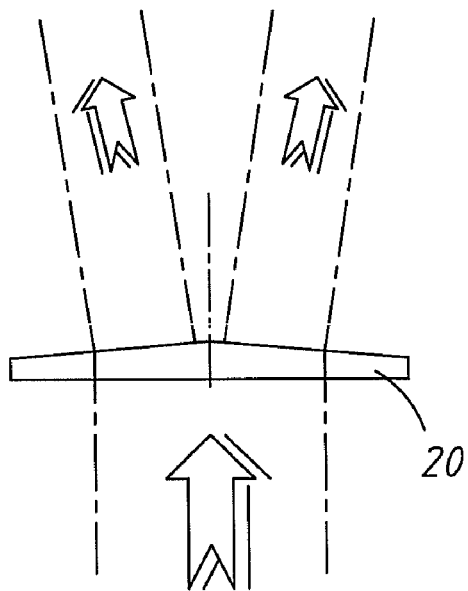
FIG. 7a, FIG. 7b and FIG. 7c are diagrams schematically showing three prisms respectively according to embodiments of the present invention.
Figure 7B:
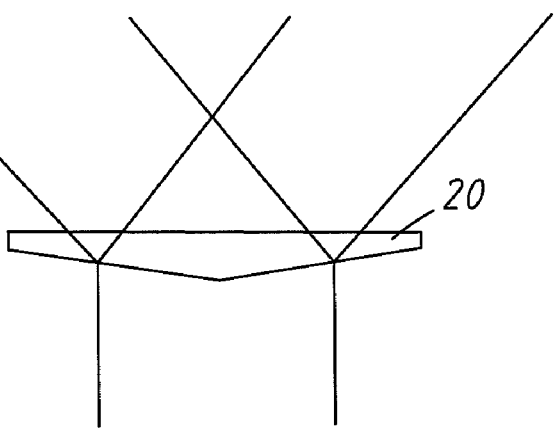
Figure 7C:
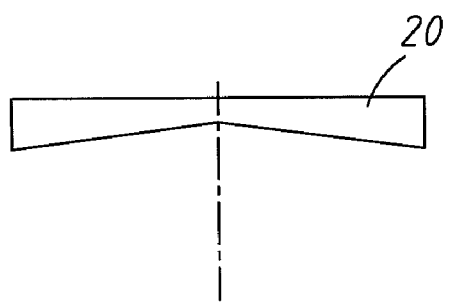

Refer to FIG. 7 for three types of prisms containing two inclined faces. FIG. 7a shows a prism having outward-protruding laser outgoing faces. FIG. 7b shows a prism having outward-protruding laser incident faces. FIG. 7c shows a prism having inward-concaved laser incident faces. All the abovementioned prisms have two inclined faces to refract a single laser beam into two laser beams.

In conclusion, the present invention proposes a novel, simple-structure, low-cost, and easy-to-calibrate laser-aiming device. In comparison with the radiant thermometer equipped with the conventional laser-aiming device, the radiant thermometer using the laser-aiming device of the present invention not only enables the user to appreciate the detectable area but also has lower price and higher market receptivity.

The embodiments described above are only to exemplify the present invention but not to limit the scope of the present invention. Any equivalent modification or variation according to the spirit of the present invention is to be also included within the scope of the present invention.

What is claimed is:

1. A laser-aiming device for a radiant thermometer that has a temperature detection device, comprising
    a laser adjustment seat arranged on said temperature detection device;
    a laser device arranged on said laser adjustment seat and generating a laser beam; and
    a prism arranged on said laser adjustment seat, located at an illuminated side of said laser beam, being coaxial with said laser device, and having two inclined faces to refract said laser beam into two laser beams forming two laser spots designating a detectable area of said temperature detection device;
    a base;
    a laser device fixing member arranged in said base, having a cylinder-like shape, and having at least one concentric rib on an inner surface thereof, whereby said laser device that is arranged inside said laser device fixing member can rotate with respect to said laser device fixing member;
    a prism press-fit member arranged on said base, located at a front end of said laser device fixing member, and having two press-fit notches; and
    a prism holding member used to hold said prism, having two press-fit protrusions corresponding to said press-fit notches for press-fitting with said prism press-fit member.

2. The laser-aiming device for a radiant thermometer according to claim 1 further comprising a laser installation seat arranged on an outer wall of said temperature detection device and used to fix said laser adjustment seat.

3. The laser-aiming device for a radiant thermometer according to claim 2, wherein said prism press-fit member further has a resin-filling groove, via which a resin is filled into said laser device fixing member to stick said laser device to said laser device fixing member.

4. The laser-aiming device for a radiant thermometer according to claim 1 further comprising a laser installation seat arranged on an outer wall of said temperature detection device and used to fix said laser adjustment seat.

5. The laser-aiming device for a radiant thermometer according to claim 4, wherein said base has a rotatable adjustment shaft protruding from a bottom thereof, and wherein said laser installation seat has a shaft insertion hole, whereby said laser adjustment seat can be rotated for calibration after said laser adjustment seat has been installed on said laser installation seat.

6. The laser-aiming device for a radiant thermometer according to claim 4, wherein said base has a first fastening hole, and wherein said laser installation seat has a second fastening hole, and wherein a fastening element is inserted through said first fastening hole and said second fastening hole, fastening said laser adjustment seat to said laser installation seat.

7. The laser-aiming device for a radiant thermometer according to claim 5, wherein said base has a first fastening hole, and wherein said laser installation seat has a second fastening hole, and wherein a fastening element is inserted through said first fastening hole and said second fastening hole, fastening said laser adjustment seat to said laser installation seat.

* * * * *